Oct. 24, 1939.  E. B. WILCOX  2,177,012
DIRECTIONAL SIGNAL FOR VEHICLES
Filed Aug. 23, 1937  3 Sheets-Sheet 2
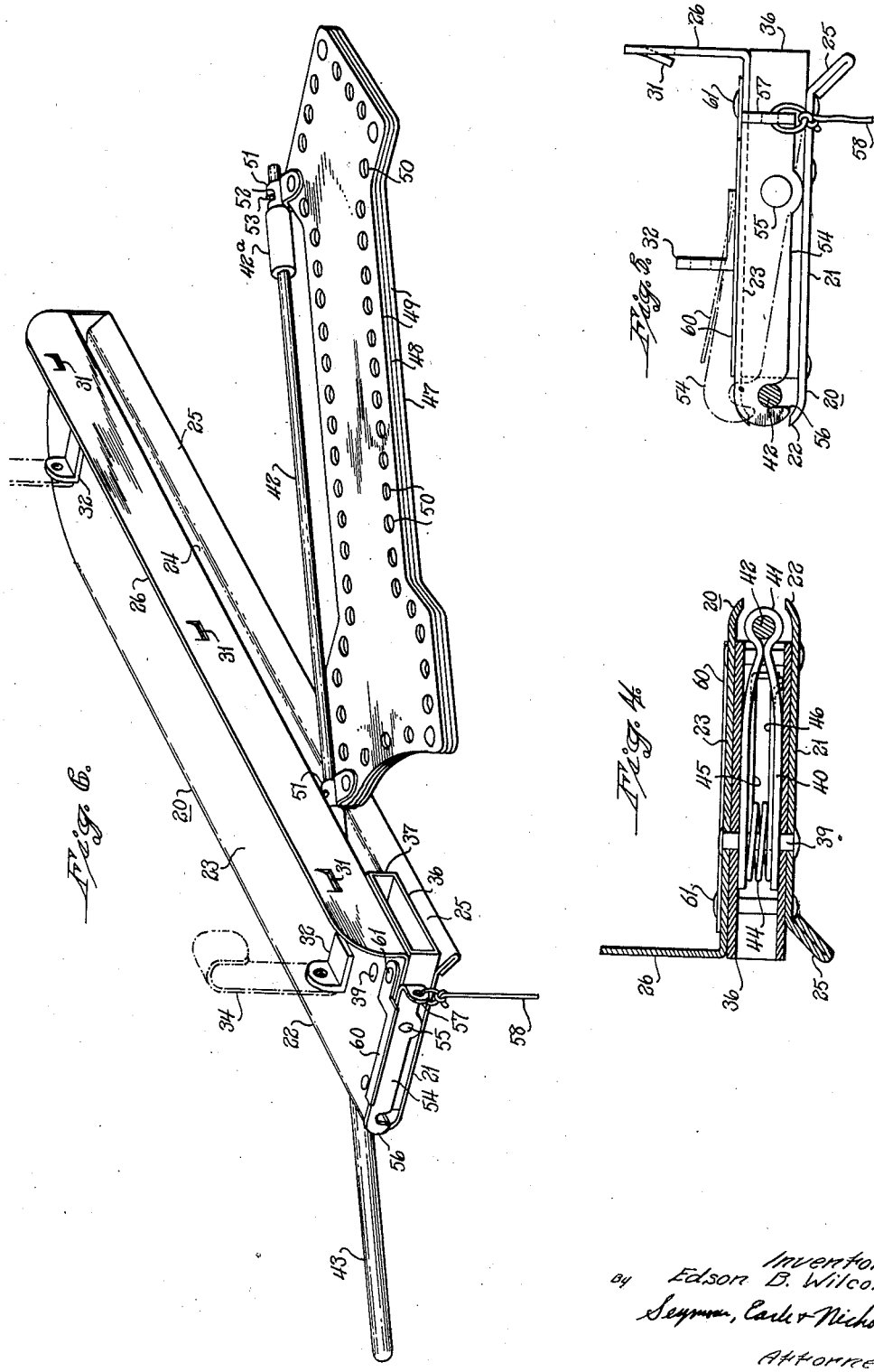
Inventor
Edson B. Wilcox
by Seymour, Carle & Nichols
Attorneys

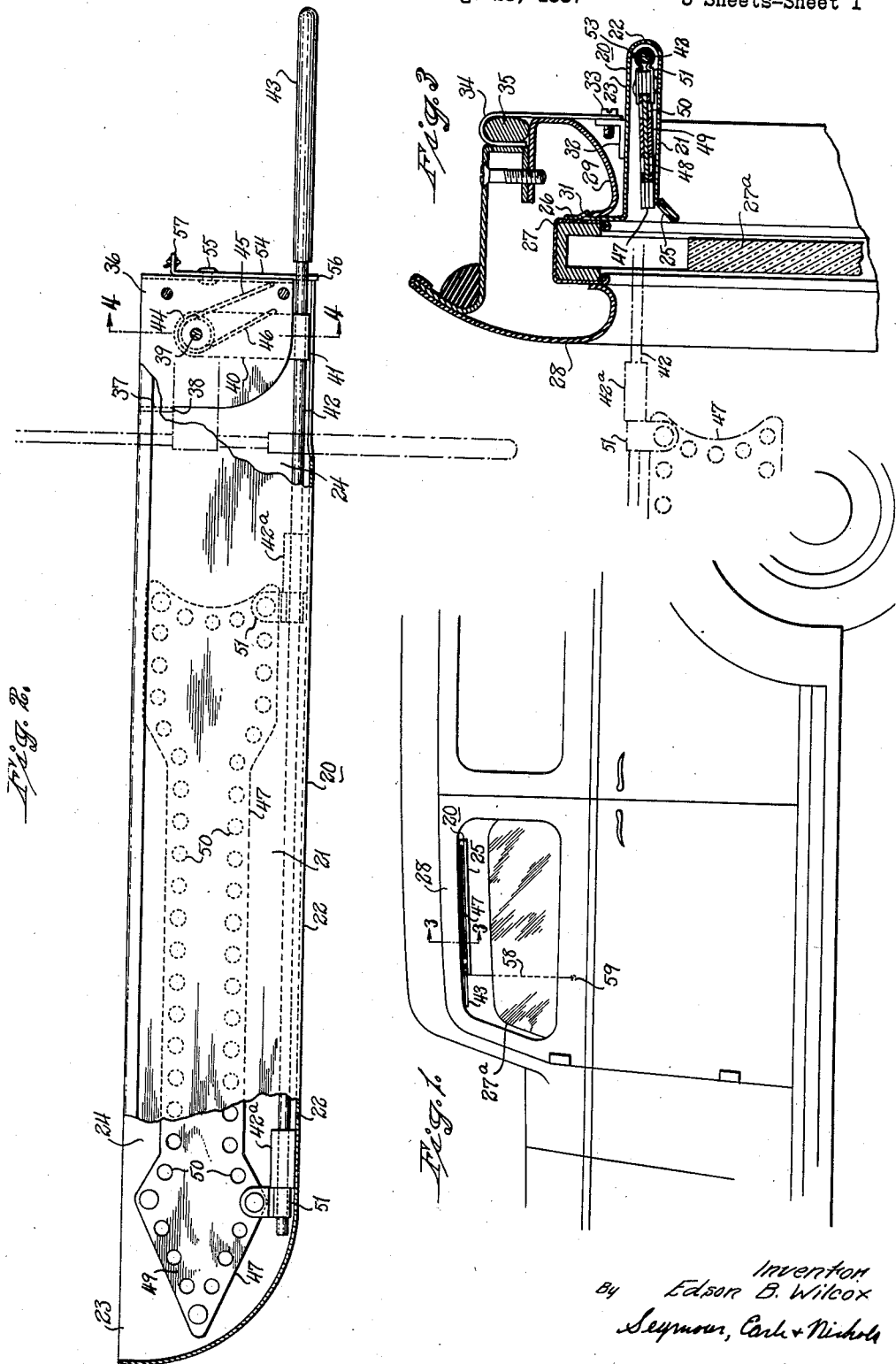

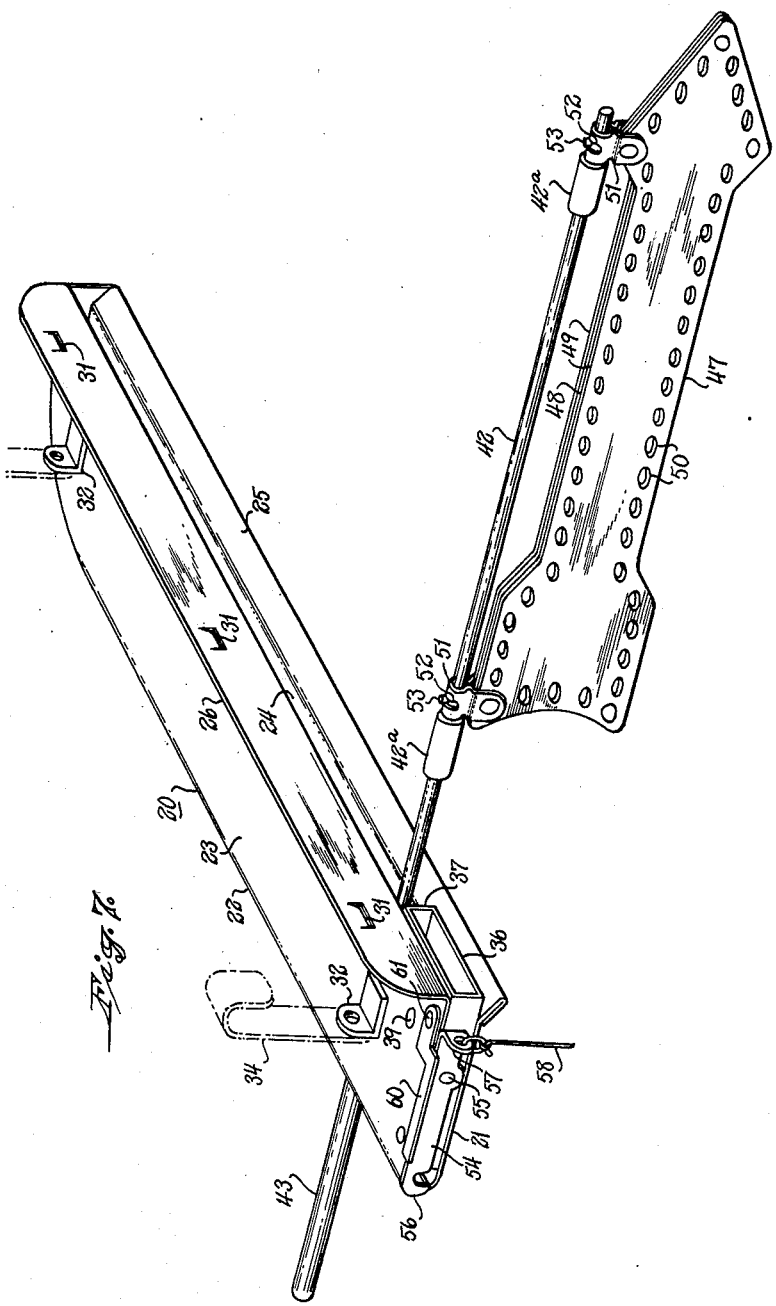

Patented Oct. 24, 1939

2,177,012

UNITED STATES PATENT OFFICE 2,177,012

DIRECTIONAL SIGNAL FOR VEHICLES

Edson B. Wilcox, Meriden, Conn.

Application August 23, 1937, Serial No. 160,366

4 Claims. (Cl. 116—52)

This invention relates to improvements in directional signals and particularly to improvements in directional signals for mounting upon automobiles or other vehicles.

One of the objects of the present invention is to provide a superior advanceable and retirable directional signal device for mounting upon an automobile or the like, and having an indicating-member which will be inconspicuous when in its retired position and sufficiently conspicuous to attract attention when in its advanced or signaling position.

A further object is to provide a superior directional signal of the character referred to which may be conveniently mounted in or adjacent the window opening of an automobile or the like.

Another object is to provide a superior directional signal for vehicles, having an indicating-member which will shift from one plane to a diverse plane in moving from its retired to its advanced or signaling position and vice versa.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a broken view in side elevation of an automobile showing a directional signal embodying the present invention installed in the left front window opening of such automobile;

Fig. 2 is an underside view of the directional signal unit showing the indicator-member in its retired position;

Fig. 3 is a transverse sectional view taken on the line 3—3 of Fig. 1;

Figure 4 is a transverse sectional view taken on the line 4—4 of Fig. 2;

Fig. 5 is a view in front end elevation of the signaling unit with the corner-arm in section;

Fig. 6 is a perspective view of the signaling unit showing the indicating-member in a position intermediate its retired position and its advanced or signaling position; and Fig. 7 is a view corresponding to Fig. 6 but showing the indicating-member in its fully advanced or signaling position.

The directional signaling device herein chosen for the purpose of illustrating the present invention includes a sheet-metal housing or frame generally designated by the reference character 20, and comprising in the main a bottom wall 21, a curved rear wall 22 and a top wall 23 extending substantially parallel with the said bottom wall 21 in spaced relationship thereabove to provide an outwardly-opening chamber 24 for the purpose as will hereinafter appear. The outer edge of the bottom wall 21 of the housing 20 is bent downwardly and reversed upon itself to form a cam-lip 25, and the outer edge of the top wall 23 of the said housing 20 is bent upwardly at substantially a right angle to the plane thereof to provide an attaching-flange 26. As is shown particularly well in Fig. 3, the attaching-flange is adapted to be forced upwardly between the guide-channel 27 of the glass pane 27a of one of the doors 28 of an automobile and the inner molding-strip 29 of such door.

For the purpose of attaching the housing 20 to the door structure 28, the attaching-flange 26 of the said housing is formed with a plurality of resilient prongs 31 which are adapted to engage with the upwardly facing edge of the molding 29, as is clearly shown in Fig. 3. Supplementing the prongs 31 just referred to in attaching the housing 20 to the door structure 28, the upper wall 23 of the said housing has secured to it a plurality of L-shaped brackets 32 to each of which latter is attached by means of a screw 33 an inverted J-shaped clip 34, the hooked end of which is adapted to hook over the usual cushion-strip 35 secured to the inner face of the door structure around the edge thereof.

Installed in the forward end of the housing 20 between the bottom and top walls 21 and 23 thereof is a tubular spacer 36 which is of substantially rectangular form in cross section and which has its rear side wall 37 cut away to provide a stop 38. Extending through the bottom and top walls of the tubular spacer 36, as well as through the bottom and top walls 21 and 23 of the housing 20, is a vertical rivet-like pivot-pin 39 upon which is pivoted the inner end of a substantially U-shaped clip 40 which has its loop-shaped outer portion 41 firmly clasped about a rod-like carrier-arm 42, as is especially well shown in Figs. 2 and 4. The carrier-arm 42 just referred to extends in both directions beyond the clip 40 and its normally forwardly extending portion constitutes a handle-portion 43 by means of which the signal device may be retired in a manner as will hereinafter appear.

Encircling the vertical pivot-pin 39 about which the carrier-arm 42 swings is an actuating-spring 44 having one arm 45 bearing against the front side wall of the tubular spacer 36 and having a complemental arm 46 bearing against the clip 40 before referred to, and thus exerting a constant effort to swing the said clip, together with the carrier-arm mounted thereon, in a direction required to swing the normally rearwardly extending portion of the said carrier-arm, outwardly into the position in which it is indicated by broken lines in Fig. 2 and by full lines in Fig. 7.

Pivotally attached to the portion of the carrier-arm 42 on the opposite side of the pivot-pin 39 from its handle-portion 43, is an indicating-member 47 which may be of any approved shape but which, as herein shown, is in the form of a plate-like arrow composed of three layers of material. The said indicating-member in the instance shown is formed of a central layer of transparent colored material 48 such for instance as glass, Celluloid or the like, and is flanked on each of its respective opposite sides by an opaque highly-reflective plate 49. Each of the plates 49 just referred to, is preferably of a different color than the layer 48 and is in the instance shown provided with a bordering series of perforations 50 which register with the perforations in the other plate 49 so that light may shine completely through the indicating-member and be visible from either side thereof. The said indicating-member may assume a wide variety of forms and if desired it may be electrically illuminated or it may be provided with a series of reflector-buttons now commonly used for increasing the visibility of objects.

The indicating-member 47 above referred to is attached to the carrier-arm 42 with capacity for swinging movement in a substantially vertical plane by means of a pair of similar spaced-apart clips 51—51, each of which is formed with an arcuate slot 52 through which projects a limit-pin 53 mounted in the adjacent portion of the carrier-arm 42 and serving to limit the swinging movement of the said indicating-member 47 with respect to the said carrier-arm.

For the purpose of releasably holding the carrier-arm 42, and hence the indicating-member 47, in its retired position as indicated particularly well in Fig. 2, a latch-member 54 is mounted for rocking movement in a vertical plane upon a stud 55 projecting horizontally from the front side wall of the tubular spacer 36. The said latch-member is provided with a latching-nose 56 which is adapted to hook over the handle-portion 43 of the carrier-arm 42. The outer end of the latch-member 54 is provided with a tail-piece 57 to which may be attached a trip-cord 58 which may have its lower end attached to the door structure 28 at about the point 59 illustrated in Fig. 1.

The latch-member 54 is yieldingly held in position required to cause its latching-nose 56 to hook over the handle-portion 43 of the carrier-arm 42, by a sheet-metal spring 60 which is secured to the top wall 23 of the housing 20 just back of the attaching-flange 26 thereof, by means of a rivet 61 or any other suitable attaching device.

When the indicating-member 47 and its associated parts are in their retired positions, as shown in Figs. 1 to 5 inclusive of the accompanying drawings, the directional signal device herein shown will be unobtrusively located in the upper portion of the window opening in the front door structure 28. To permit the use of the directional signal device when the same is mounted as shown, the window glass 27a should be slightly lowered as indicated.

With the directional signaling device installed as shown, when it is desired to indicate a left turn, the operator of the vehicle will pull upon the trip-cord 58 with the effect of lifting the latching-nose 56 of the latch-member 54 (against the tension of the spring 60) to thus free the carrier-arm 42 from restraint by the said latching-nose. Immediately that the latching-nose 56 is lifted clear of the carrier-arm 42, the actuating-spring 44 will act through the carrier-bracket 40 to swing the said carrier-arm 42 outwardly about the vertical pivot-pin 39 as an axis, until the said carrier-arm and indicating-member 47 and associated parts assume the positions in which they are shown in Fig. 7, in which it will be noted that the said indicating-member 47 has swung downwardly about the carrier-arm 42 as a center so as to now lie in a vertical plane. The horizontal swinging movement of the carrier-arm 42 is limited by the engagement of the said arm with the stop 38 and the vertical swinging movement of the indicating-member 47 about the carrier-arm 42 is, as before pointed out, limited by the coaction of the arcuate slots 52 and limit-pins 53.

In moving outwardly from the position in which it is shown in Figs. 1 to 5 inclusive to the position in which it is shown in Fig. 7, the inner upper corner of the indicating-member 47 will ride down the surface of the cam-lip 25 of the housing 20 and thus shift from a horizontal plane to a vertical plane.

When it is desired to retire the indicating-member 47, the operator thrusts forwardly and outwardly upon the handle-portion 43 of the carrier-arm 42 until the said indicating-member is again within the chamber 24 in the housing 20 and the latching-nose 56 of the latch-member 54 has again hooked over the handle-portion 43 of the carrier-arm 42 and the parts have reassumed the positions in which they are shown in Figs. 1 to 5 inclusive. For the purpose of cushioning the engagement of the carrier-arm 42 with the rear wall 22, the said arm is provided with two (more or less) tubular rubber pads 42a which are engageable with the said rear wall 22.

During the retiring movement of the carrier-arm 42 from the position in which it is shown in Fig. 7 to the position shown in Figs. 1 to 5 inclusive, the upper inner corner of the indicating-member 47 will be brought into engagement with the cam-lip 25 of the housing 20, as is shown in Fig. 6, with the effect of causing the said indicating-member to gradually turn about the carrier-arm 42 as a center from its full vertical position into a horizontal position for retirement into the chamber 24 in the said housing 20.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The combination with a door structure of an automobile having a window top rail and a pane of glass movable edgewise up toward and down from said top rail; of a housing organized with said top rail; the said housing having a substantially-horizontal indicator-receiving pocket with an opening adjacent the path of movement of said pane of glass; and a direction-indicating device pivotally mounted to said housing for movement through said opening out of said pocket and transversely across the path of movement of said pane of glass to indicating position and back again into retired position in said pocket, both said housing, and said direction-indicating device when in retired position, being located inside the path of movement of said pane of glass so that said pane of glass can move to completely closed position.

2. The combination with a door structure of an automobile having a window top rail and a pane of glass movable edgewise up toward and down from said top rail; of an elongated housing organized with said top rail; the said housing having a substantially-horizontal indicator-receiving pocket with an elongated opening adjacent the path of movement of said pane of glass; and a direction-indicating device pivotally mounted at the front end portion of said housing toward the front of the automobile for movement through said opening out of said pocket and transversely of the direction of movement of said pane of glass to indicating position and back again into retired position in said pocket, and said direction-indicating device including an indicator-member mounted for reversible swinging movement in a substantially vertical plane.

3. The combination with a door structure of an automobile having a window top rail and a pane of glass movable edgewise up toward and down from said top rail; of a housing organized with said top rail; the said housing having a substantially-horizontal indicator-receiving pocket with an elongated opening adjacent the path of movement of said pane of glass; and a direction-indicating device including an elongated carrier-arm having a transversely-extending portion pivotally mounted to said housing and adjacent the path of movement of said pane of glass for movement of said carrier-arm through said opening out of said pocket and transversely of the direction of movement of said pane of glass to indicating position and back again into retired position in said pocket, and said direction-indicating device also including an indicator-member mounted for reversible swinging movement in a substantially vertical plane.

4. The combination with a door structure of an automobile having a window top rail and a pane of glass movable edgewise up toward and down from said top rail; an elongated housing organized with said top rail; the said housing having a substantially-horizontal indicator-receiving pocket with an elongated opening adjacent the path of movement of said pane of glass; and a direction-indicating device pivotally mounted at the front end portion of said housing toward the front of the automobile for movement through said opening out of said pocket and transversely across the path of movement of said pane of glass to indicating position and back again into retired position in said pocket, both said housing, and said direction-indicating device when in retired position, being located inside the path of movement of said pane of glass so that said pane of glass can move to completely closed position, and said direction-indicating device including an indicator-member mounted for reversible swinging movement in a substantially vertical plane.

EDSON B. WILCOX.